(12) United States Patent
Park et al.

(10) Patent No.: US 10,382,541 B2
(45) Date of Patent: Aug. 13, 2019

(54) SERVER AND METHOD FOR PROVIDING DESIGN DATA FOR APPLICATION AND SYSTEM FOR GENERATING APPLICATION

(71) Applicant: SAMSUNG ELECTRONICS CO., LTD., Suwon-si (KR)

(72) Inventors: Sang-hyun Park, Hwaseong-si (KR); Yoon-hoe Gu, Gwacheon-si (KR); Ji-hye Kwon, Seoul (KR); Soo-jung Kim, Hanam-si (KR); Go-eun Lee, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 381 days.

(21) Appl. No.: 14/538,432

(22) Filed: Nov. 11, 2014

(65) Prior Publication Data

US 2015/0264137 A1 Sep. 17, 2015

(30) Foreign Application Priority Data

Mar. 17, 2014 (KR) ........................ 10-2014-0031082

(51) Int. Cl.
*G06F 15/16* (2006.01)
*H04L 29/08* (2006.01)
(Continued)

(52) U.S. Cl.
CPC ............ *H04L 67/1095* (2013.01); *G06F 8/20* (2013.01); *G06F 8/38* (2013.01); *H04L 67/327* (2013.01); *H04L 67/42* (2013.01)

(58) Field of Classification Search
CPC .................................................. H04L 67/1095
(Continued)

(56) References Cited

U.S. PATENT DOCUMENTS

| 5,311,438 A * | 5/1994 | Sellers ............... G05B 19/4181 700/96 |
| 2002/0073165 A1* | 6/2002 | McNulty ........... G06F 17/30893 709/217 |

(Continued)

FOREIGN PATENT DOCUMENTS

EP 2518617 A1 10/2012
WO 2013050060 A1 4/2013

OTHER PUBLICATIONS

10 Places to Sell Templates By WebdesignerDepot Staff • Posted Dec. 17, 2008, https://www.webdesignerdepot.com/2008/12/10-places-to-sell-templates/ Written exclusively for WDD by Thursday Bram and WDD.*

(Continued)

*Primary Examiner* — Hamza N Algibhah
(74) *Attorney, Agent, or Firm* — Sughrue Mion, PLLC

(57) ABSTRACT

An application design server, method and system are provided. The application design server according to an exemplary embodiment includes a communicator configured to receive design data from a first host device and a controller configured to, in response to receiving a request for the design data from a second host device, transmit the received design data to the second host device, and in response to receiving updated design data corresponding to the design data from the first host device, control the communicator to transmit the updated design data to the second host device.

12 Claims, 7 Drawing Sheets

(51) Int. Cl.
*H04L 29/06* (2006.01)
*G06F 8/20* (2018.01)
*G06F 8/38* (2018.01)

(58) Field of Classification Search
USPC .......................................................... 709/203
See application file for complete search history.

(56) References Cited

U.S. PATENT DOCUMENTS

| | | | |
|---|---|---|---|
| 2003/0172145 | A1 | 9/2003 | Nguyen |
| 2006/0253480 | A1* | 11/2006 | Staples .................. G06F 17/50 |
| 2011/0231260 | A1 | 9/2011 | Price |
| 2012/0089960 | A1 | 4/2012 | Medvidovic et al. |
| 2014/0019480 | A1 | 1/2014 | Rychikhin |
| 2014/0304333 | A1* | 10/2014 | Tredoux .................. H04L 67/16 |
| | | | 709/204 |
| 2015/0135104 | A1* | 5/2015 | Osterhoff .................. G06F 8/20 |
| | | | 715/765 |
| 2015/0169517 | A1* | 6/2015 | Hsu ..................... G06F 17/3089 |
| | | | 715/234 |

OTHER PUBLICATIONS

Communication dated Jul. 10, 2015, issued by the European Patent Office in counterpart European Patent Application No. 15156601.5.
Virpi Kristiina Tuunainen et al: "Mobile Service Platforms: Comparing Nokia OVI and Apple App Store with the IISIn Model", Mobile Business (ICMB), 2011 Tenth International Conference on Mobile Business, IEEE, Jun. 20, 2011 (Jun. 20, 2011), pp. 74-83, XP032460899.
Communication dated Jan. 30, 2017, issued by the European Patent Office in counterpart European Application No. 15156601.5.
Communication dated Apr. 26, 2018, from the European Patent Office in counterpart European Application No. 15156601.5.

* cited by examiner

230

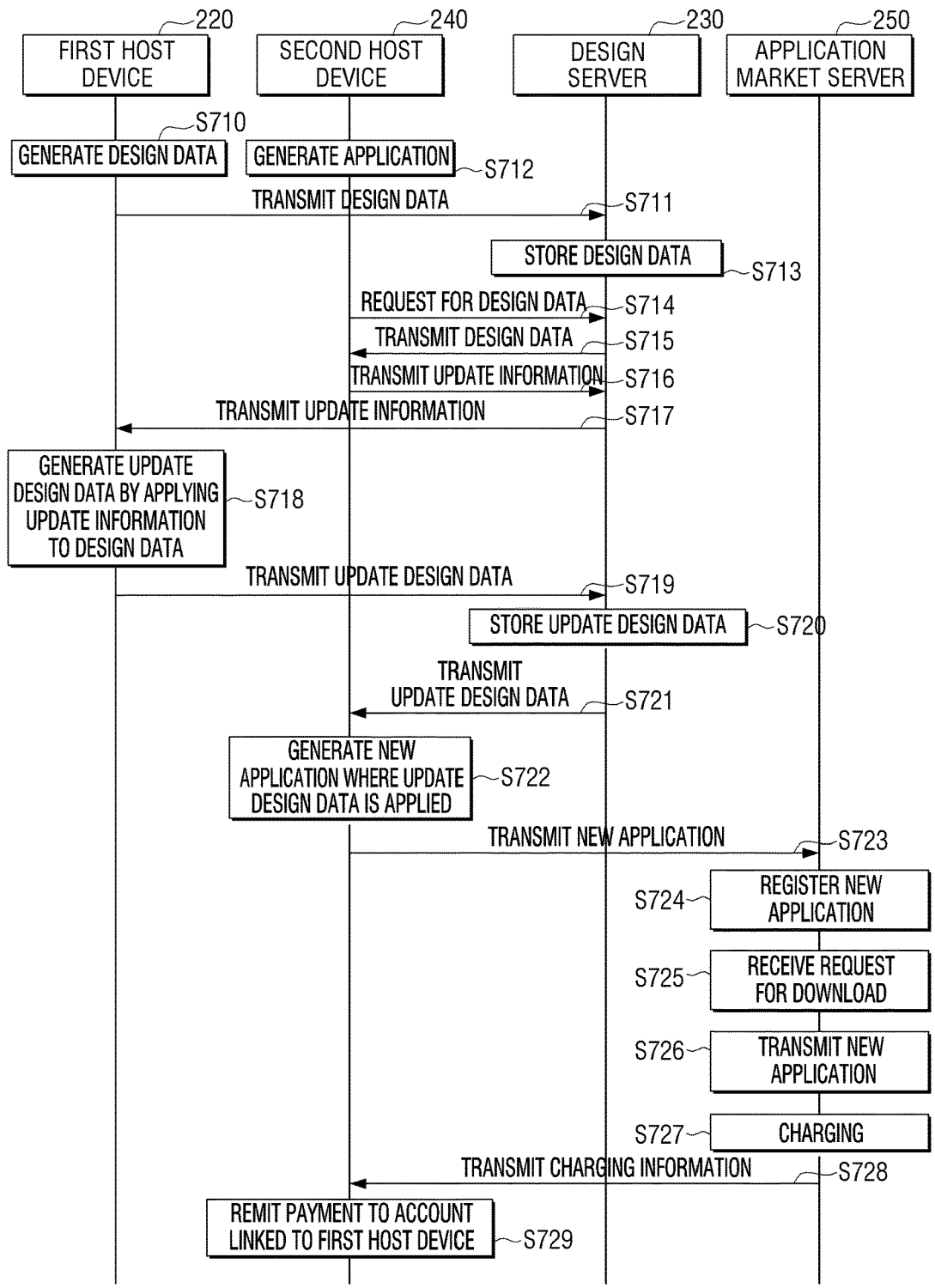

SERVER AND METHOD FOR PROVIDING DESIGN DATA FOR APPLICATION AND SYSTEM FOR GENERATING APPLICATION

CROSS-REFERENCE TO RELATED APPLICATION

This application claims priority from Korean Patent Application No. 10-2014-0031082, filed in the Korean Intellectual Property Office on Mar. 17, 2014, the disclosure of which is incorporated herein by reference in its entirety.

BACKGROUND

1. Field

Servers, methods and systems consistent with the exemplary embodiments relate to a server and a method for providing design data for an application and a system for generating an application, and more particularly, to a server and a method for providing design data to be applied in a new application and a system thereof.

2. Description of the Related Art

With the development of electronic technology, various types of mobile devices have been developed and distributed. Specifically, user terminal devices such as mobile phones, smart phones, and tablet PCs are widely used. Such user terminal devices are intelligent terminals which include a computer-aided function, such as Internet communication and information search, and may install an application as desired by a user. An application is, for example, a program which can perform an operation selected by the user.

By installing a desired application in a user terminal device, a user may make use of an Internet banking service or reserve a ticket for a movie or a play conveniently and at any location.

Thousands of applications can be provided depending on the user terminal devices, and hundreds of types of applications are being developed each day. In particular, as applications reflect users' needs and social issues, applications need to be continuously developed in accordance with users' needs and social issues which change rapidly.

The process of developing an application consists of generating design data to be applied to the application and generating the application. The design data to be applied to a specific application is developed by, for example, a designer.

However, there is no tool for generating design data, so it is complicated for a designer to generate design data.

In addition, even though an application developer requests a specific business enterprise or a specific designer to generate design data which will be applied to a specific application, the developer cannot be provided with various design data for the specific application.

SUMMARY

One or more exemplary embodiments provide a design server and a method for providing design data to be applied to a new application, and a method of providing a system thereof.

According to an aspect of an exemplary embodiment, there is provided an application design server including a communicator configured to receive design data from a first host device, and a controller configured to, in response to receiving a request for the design data from a second host device, transmit the received design data to the second host device, and in response to receiving updated design data corresponding to the design data from the first host device, control the communicator to transmit the updated design data to the second host device.

The design data may be related to user interface which will be applied to a new application.

The controller, in response to update information to update the design data being received from the second host device, may control the communicator to transmit the update information to the first host device, and in response to the updated design data which is generated by applying the update information to the design data being received from the first host device, may control the communicator to transmit the updated design data to the second host device.

The controller may receive the update information from the second host device a plurality of times, and receive the updated design data according to the update information from the first host device a plurality of times.

The application design server may further include a storage configured to store a plurality of pieces of design data including the design data by category.

A request from the second host device may include category information, and the controller may search design data including the category information in the storage, and transmit the design data including the category information which in found according to the search to the second host device.

The controller may match the design data with apparatus information regarding the second host device to which the updated design data is transmitted, and store the updated design data.

According to an aspect of another exemplary embodiment, there is provided a method of providing design data of an application design server, the method including receiving design data from a first host device, in response to receiving a request for the design data from a second host device, transmitting the received design data to the second host device, and in response to receiving updated design data corresponding to the design data from the first host device, transmitting the updated design data to the second host device.

The design data may be related to a user interface which will be applied to a new application.

The method may further include, in response to receiving update information to update the design data from the second host device, transmitting the update information to the first host device, and the transmitting the updated design data to the second host device may include, in response to receiving the updated design data which is generated by applying the update information to the design data from the first host device, controlling the communicator to transmit the updated design data to the second host device.

In response to receiving the update information from the second host device a plurality of times, receiving the updated design data according to the update information from the first host device a plurality of times.

The method may include storing the received design data in a memory by category, and the transmitting the received design data to the second host device may include searching design data including category information and a keyword included in the request from the second host device and transmitting the design data which is found according to the searching to the second host device.

An application generating system according to an exemplary embodiment includes a first host device configured to generate design data using a design toolkit, a design server configured to store the design data generated by the first host device, and a second host device configured to request the design data from the design server and receive the design data, and the design server, in response to receiving updated design data corresponding to the design data from the first host device, transmits the updated design data to the second host device, and the second host device generates a new application using the updated design data.

The design data may be related to a user interface screen to be applied to the new application.

The application generating system may further include an application market server configured to, in response to receiving a request from the second host device, register the new application where the updated design data is applied, and in response to receiving a download request from a user terminal device, transmit the registered new application to the user terminal device.

The application market server may process payment with respect to the user terminal device according to a download regarding the new application, and transmit payment information regarding the payment to at least one of the first host device and the second host device.

The design toolkit may comprise a user interface including a plurality of commands for generating the design data for the application.

BRIEF DESCRIPTION OF THE DRAWINGS

The above and/or other aspects will be more apparent by describing certain exemplary embodiments with reference to the accompanying drawings, in which:

FIG. 7 illustrates a timing view provided to explain an operation of an application generating system.

DETAILED DESCRIPTION

Figure 1:
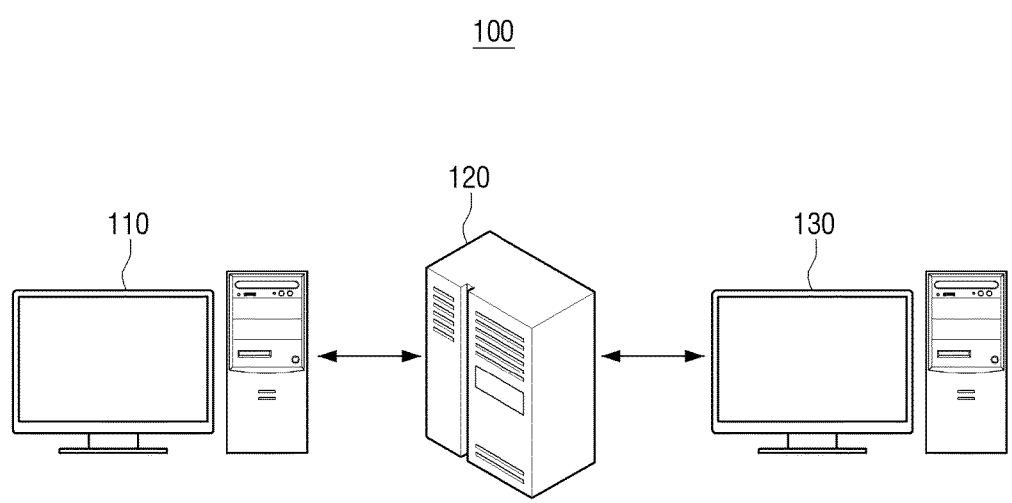
FIG. 1 is a view illustrating an application generating system according to an exemplary embodiment.

Hereinafter, certain exemplary embodiments will be described in detail with reference to accompanying drawings. In the following description, same reference numerals are used for analogous elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

In the description of the exemplary embodiments, relational terms such as first and second, and the like, may be used to distinguish one entity from another entity, without necessarily implying any actual relationship or order between such entities unless indicated.

FIG. 1 is a view illustrating an application generating system according to an exemplary embodiment. Referring to FIG. 1, an application generating system 100 is a system for developing a new application, and includes a first host device 110, an application design server 120 (hereinafter, referred to as 'design server'), and a second host device 130. Herein, the first host device 110 and the second host device 130 may communicate with the design server 120 via the Internet.

The process of developing a new application includes generating design data to be applied to the new application and generating the new application. The first host device 110 generates design data, and the second host device 130 generates a new application.

The first host device 100 generates design data using a design toolkit. Herein, the design data may be design information regarding a user interface screen which will be applied to a new application. The design toolkit refers to a tool for generating design data according to instructions input by a designer (hereinafter, referred to as 'first user') who designs or produces the design data. The designer can be, for example, a computer programmer.

The design server 120 stores or markets design data, and may be an open server which releases design data.

When design data is received from the first host device 110, the design server 120 stores the design data.

In addition, when updated design data is received from the first host device 100, the design server 120 stores the updated design data. Herein, the updated design data may be design data which is modified according to a request by a developer (hereinafter, referred to as 'second user') who designs or produces an application. Accordingly, when updated design data regarding certain design data is received, the design server 120 may match the previous design data with the updated design data and store the data. For example, updated design data may be stored in a folder where the previous design data is stored, or updated design data may be stored along with storage path information of the previous design data.

In FIG. 1, only one host device, the first host device 110, is illustrated, but this is only an example. A plurality of the first host apparatuses 100 may store design data or updated design data in the design server 120.

The second host device 130 requests design data from the design server 120 and receives the design data. In addition, if updated design data corresponding to specific design data is stored in the design server 130, the second host device 130 may receive the updated design data from the design server 120.

The second host device 130 generates an application, and by applying updated design data to the application, the second host device 130 may generate a new application which will be produced as a product.

As described above, by using the application generating system according to an exemplary embodiment, the design server 120 may store design data or updated design data received from the first host device 110, and provide the design data upon a request of the second host device 130. Accordingly, the second user may obtain design data, which can be applied to an application, from the design server 120.

Figure 2:
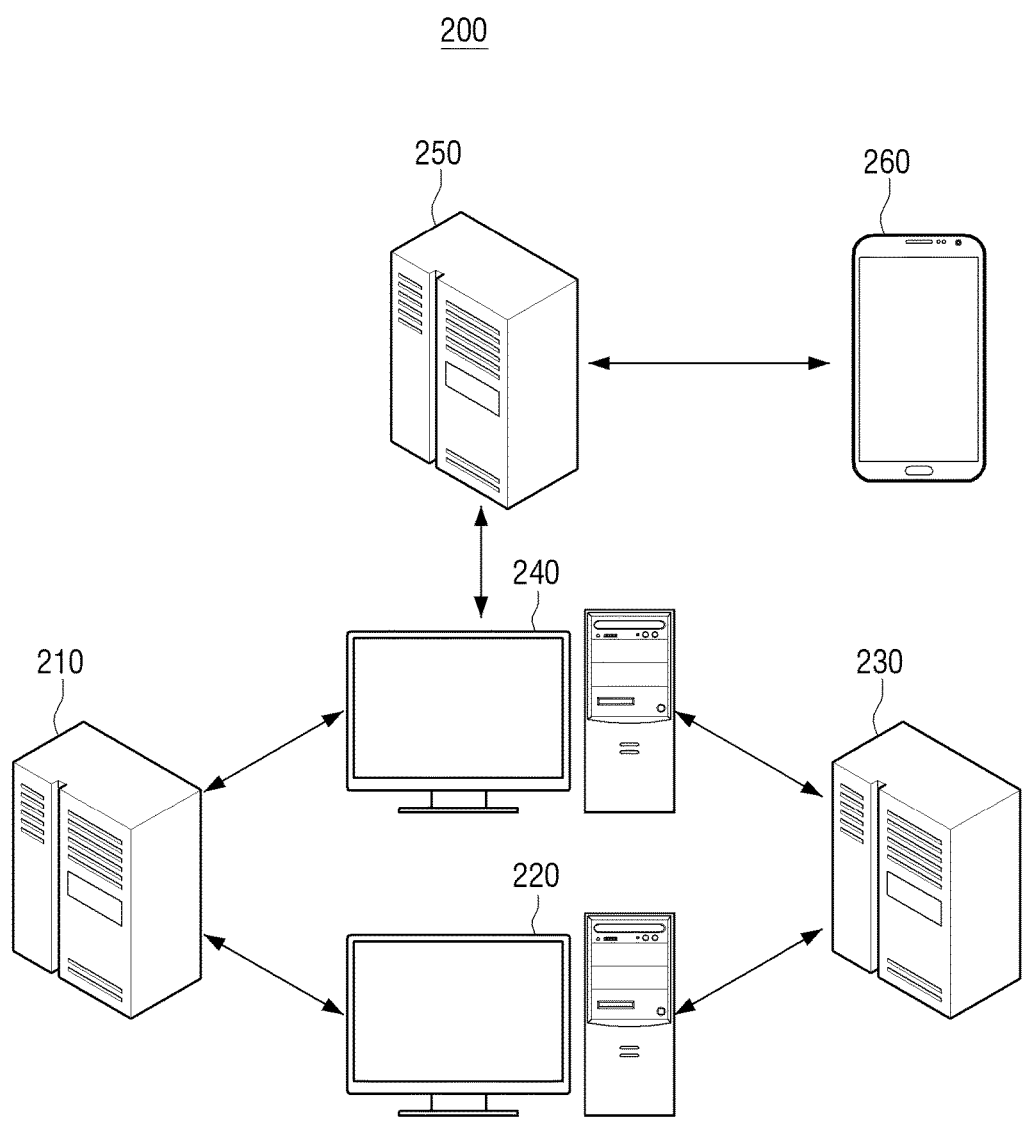
FIG. 2 is a view illustrating an application generating system according to another exemplary embodiment.

FIG. 2 is a view illustrating an application generating system according to another exemplary embodiment. Referring to FIG. 2, an application generating system 200 includes a toolkit management server 210, a first host device 220, a design server 230, a second host device 240, and an application market server 250.

The toolkit management server 210 manages a design toolkit for generating design data to be applied to various applications and an application toolkit for generating an application.

The design toolkit may include a User interface (UI) design toolkit and a User eXperience (UX) design toolkit. In addition, the application toolkit may include Software Development (SDX). In particular, there may be a plurality of application toolkits according to the type of operating system for an application for different operating systems. For example, there may be a toolkit for iOS, a toolkit for Android, a toolkit for Window 8.0, a toolkit for Window 8.1, a toolkit for Linux, a toolkit for Tizen, etc.

If there is a request for a design toolkit from the first host device 220, the toolkit management server 210 may transmit the design toolkit to the first host device 220. In addition, if there is a request for an application toolkit from the second host device 240, the toolkit management server 210 transmits the application toolkit to the second host device 240.

The first host device 220 generates design data which can be applied to various applications. The first host device 220 may be a computer, such as a desktop computer or a notebook computer, etc., which is used by the first user who designs or produces the design data. If a design toolkit is received, the first host device 220 may install the design toolkit automatically or have the design toolkit installed by the first user.

If the first user designs or produces a user interface screen using tools of the design toolkit while the design toolkit is executed, the first host device 220 may generate design data accordingly. As such, the first host device 220 may generate a plurality of design data which can be applied to various applications. Therefore, design data can be generated easily when a design toolkit is used.

If design data is generated, the first host device 220 transmits the design data to the design server 230. In this case, the first host device 220 may transmit the design data to the design server 230 using predetermined server information. Alternatively, the first host device 220 may transmit the design data to the design server 230 using server information according to a user input.

The design data may include identification information of the design data, information regarding a category the design data belongs to, and information regarding an apparatus which generates the design data.

If design data is received from the host device 220, the design server 230 stores the design data. That is, the design server 230 may register the design data in a product which can be downloaded by the second host device 240.

The design server 230 may store design data in a memory (not shown) by category. Specifically, the design server 230 may store various design data, and may group application items where the design data can be applied by category. For example, design data may be stored by category such as games, finance, stocks, education, weather, news, children, sports, travel, food, music, etc. In this case, the design server 230 may check category information included in design data, and store the design data according to the category.

The second host device 240 generates various applications. The second host device 240 may be a computer, such as a desktop computer, or a notebook computer, etc. which is used by the second user who designs or produces an application. If an application toolkit is received, the second host device 240 may install the application toolkit automatically or have the application toolkit installed manually by a user.

If the second user designs or produces an application using tools of the application toolkit while the application toolkit is executed, the first host device 220 may generate an application accordingly. The application generated at this stage may include only a programming language without any design data related to a user interface screen.

The second host device 240 may connect to the design server 230 according to a user command. In this state, if a request for design data is requested, the design server 230 transmits the design data to the second host device 240 in response to the request. The request includes category information to use for searching and the design server 230 may search design data using the category information.

In addition, while the second host device 240 is connected to the design server 230, the second user may check design data stored in the design server 230. Accordingly, if the second user selects design data to be applied to an application, the design server 230 may transmit the selected design data to the second host device 240.

If certain design data is transmitted to the second host device 240, the design server 230 may match apparatus information of the second host device with the design data and store the information.

The design data generated by the first host device 220 may be generated temporarily with respect to a plurality of applications included in a specific category. That is, the design data is not generated by targeting an application generated by the second host device 240, and the application needs to be modified. Accordingly, the second user may input update information to the design data in the second host device 240.

The second host device 240 transmits the update information to the design server 230. The update information may include identification information of the design data and information regarding items to be modified in the design data.

If the update information is received, the design server 230 may check the identification information of the design data included in the update information, and search for the corresponding design data. From the design data, the design server 230 may confirm information on an apparatus which generates the design data, such as the first host device 220. Thus, the design server 230 transmits the update information to the first host device 220 using the confirmed apparatus information.

If the update information is received, the first host device 220 displays a message informing the user that the update information is received. Alternatively, if the update information is received, the first host device 220 may execute a design toolkit automatically.

If the update information is applied to the existing design data on the design toolkit, the first host device 220 may generate updated design data. Subsequently, the first host device 220 may transmit the updated design data to the design server 230.

In the above description, the first host device 220 receives update information and generates updated design data, but this is only an example. Specifically, the first user may have a meeting in person with the second user to verbally discuss items to be updated verbally or a hard copy may be shared between the first user and the second user. In this case, the first host device 220 may apply the items to be updated to the design data according to a user command, thereby generating updated design data.

If the updated design data is received from the first host device 220, the design server 230 may match the updated design data to the corresponding existing design data and store the updated design data. Accordingly, the design data may be stored along with apparatus information regarding the apparatus which downloads the design data and the updated design data. Thus, the design server 230 may transmit the updated design data to the second host device 240 using the apparatus information which downloads the design data.

The second host device 240 may transmit update information to the first host device 220 through the design server 230 a single time or a plurality of times. In addition, the first host device 220 may generate updated design data a single time or a plurality of times according to the number of times update information is received.

Once updated design data is received, the second host device 240 may generate a new application which will be provided as a product by applying the updated design data to the application. Accordingly, design data may be executed according to the operation of the new application, and a user interface screen may be displayed. This new application program can be executable by an operating system, such as an iOS operating system, an Android operating system, a Windows 8 operating system, a Linux operating system, and a Tizen operating system. Although these operating are described, the exemplary embodiments are not limited to these operating systems. The new application program may be executable by an operating system which can be mounted on various electronic devices, such as a mobile phone, a smart phone, a notebook PC, a tablet PC, a desktop PC, middleware, and an integrated software platform combining application programs.

In addition, the second host device 240 may connect to the application market server 250 and request registration of the new application where updated design data is applied.

The application market server 250 provides various applications by requiring payment or free of charge, and may be an application store server. For example, servers like Apple Store, Samsung Apps, and Android market may be the application market server 250. However, these are merely examples and other application store servers can be used.

Once a new application is registered, the application market server 250 may start selling the new application or make the application available for others to use.

A user terminal device 260 may connect to the application market server 250 via the Internet and download an application. If the user terminal device 260 requests to download a new application which is registered by the second host device 240, the application market server 250 transmits the new application to the user terminal device 260.

The application market server 250 may charge or require payment from the user terminal device 260 according to the new application which is downloaded. The payment process follows a known payment process, so a detailed description will not be provided.

Once the payment process is completed, the application market server 250 transmits the payment information to at least one of the first host device 220 and the second host device 240. In addition, the amount charged may be remitted to an account linked to the first host device 220 or the second host device 240.

Once the payment information is received, the first host device 220 or the second host device 240 may display the payment information, and divide the amount charged according to the payment information.

As described above, the design server 230 stores design data in an application generating system and thus, provides an environment where the second host device 240 may obtain various kinds of design data. Accordingly, the second user may select optimum design data which is appropriate for a new application, thereby improving the quality of the new application.

In addition, the first host device 220 or the second host device 240 may receive payment information and the amount charged according to a download of new application and thus, may divide profits between the first user and the second user in a transparent manner.

Figure 3:
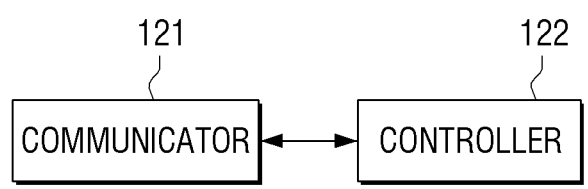
FIG. 3 is a block diagram illustrating configuration of a design server according to an exemplary embodiment.

FIG. 3 is a block diagram illustrating configuration of a design server according to an exemplary embodiment. Referring to FIG. 3, the design server 120 includes a communicator 121 and a controller 122. The design server 120 is an open-type server which opens design data which is applicable to various applications, and may be a storage server or a market server for the design data.

The communicator 121 may communicate with a plurality of host devices via the Internet. According to an exemplary embodiment, the communicator 121 may communicate with the first host device 110 which generates design data and the second host device 130 which generates a new application.

The communicator 121 receives design data from the first host device 110, and receives a request for the design data from the second host device 130.

The controller 122 transmits design data received from the first host device 110 to the second host device 130 upon a request from the second host device 130. In addition, once updated design data corresponding to the design data is received from the first host device 110, the controller 122 controls the communicator 122 to transmit the updated design data to the second host device 130.

As the design server 120 illustrated in FIG. 3 provides design data or updated design data which can be applied to various applications, the process of generating design data can be more specialized.

Figure 4:
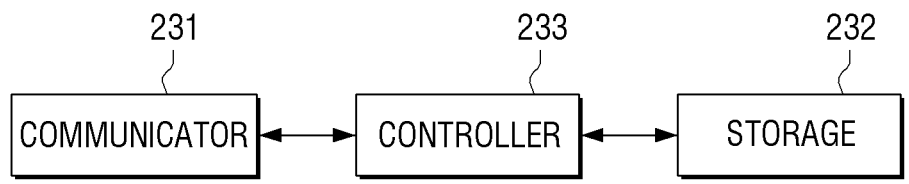
FIG. 4 is a block diagram illustrating a configuration of a design server according to another exemplary embodiment.

FIG. 4 is a block diagram illustrating a configuration of a design server according to another exemplary embodiment. Referring to FIG. 4, the design server 230 includes a communicator 231, a storage 232, and a controller 233.

The communicator 231 may communicate with a plurality of host devices via the Internet. According to an exemplary embodiment, the communicator 121 may communicate with the first host device 220 which generates design data and the second host device 240 which generates a new application.

The storage 232 stores design data and information regarding the design data.

The controller 233 controls the overall operations of the design server 230.

Specifically, once design data is received from the first host device 220, the controller 233 stores the design data in the storage 232 according to categories. The design data may include identification information regarding the design data, information on a category where the design data is applicable, and information on an apparatus which generates the design data.

The identification information regarding the design data may be the name or product number of the design data. The information on a category where the design data is applicable may be application items where the design data is applicable. For example, if certain design data is applied to a "game" application, the category information of the design data may be "game", and the information on the apparatus which generates the design data may be an Internet Protocol (IP) address of the apparatus.

The identification information and the category information regarding the design data may be set by a user, and the apparatus information may be obtained from the apparatus when the design data is generated.

If a request for design data is received from the second host device 240, the controller 233 reads out the corresponding design data from the storage 232, and controls the communicator 231 to transmit the design data to the second host device 240.

As a request for design data includes category information, the controller 233 may transmit design data corresponding to the category information to the second host device 240.

In addition, once a selection signal regarding certain design data is received through the communicator 231, the controller 233 may read out design data corresponding to the selection signal from the storage 232, and control the communicator 231 to transmit the design data to the second host device 240.

As described above, if the design data is transmitted to the second host device 240, the controller 233 may control the storage 232 to match the design data with apparatus information regarding the second host device 240 (for example, the IP address) and store the data.

The communicator 231 may receive update information regarding design data from the second host device 240. The update information may include identification information of design data related to the update information. Accordingly, the controller 233 may search design data which is consistent with the identification information of the design data in the storage 232.

As the design data which is found based on the search includes information on an apparatus which generates the design data, the controller 233 may control the communicator 231 to transmit the update information to the first host device 220 which has the apparatus information.

The communicator 231 may receive updated design data where the update information is applied from the first host device 220. In this case, the controller 233 may match the updated design data with existing design data and store the data in the storage 232. Accordingly, the design data may be stored in the form where apparatus information regarding the second host device 240 to which the design data is transmitted and the updated design data is matched.

The controller 233 controls the communicator 231 to transmit the updated design data to the second host device 240 using the apparatus information regarding the second host device 240 which is matched with the design data.

According to the design server 230 illustrated in FIG. 4, various kinds of design data can be provided. Thus, the second user may select an optimum design data which is appropriate for an application.

Figure 5:
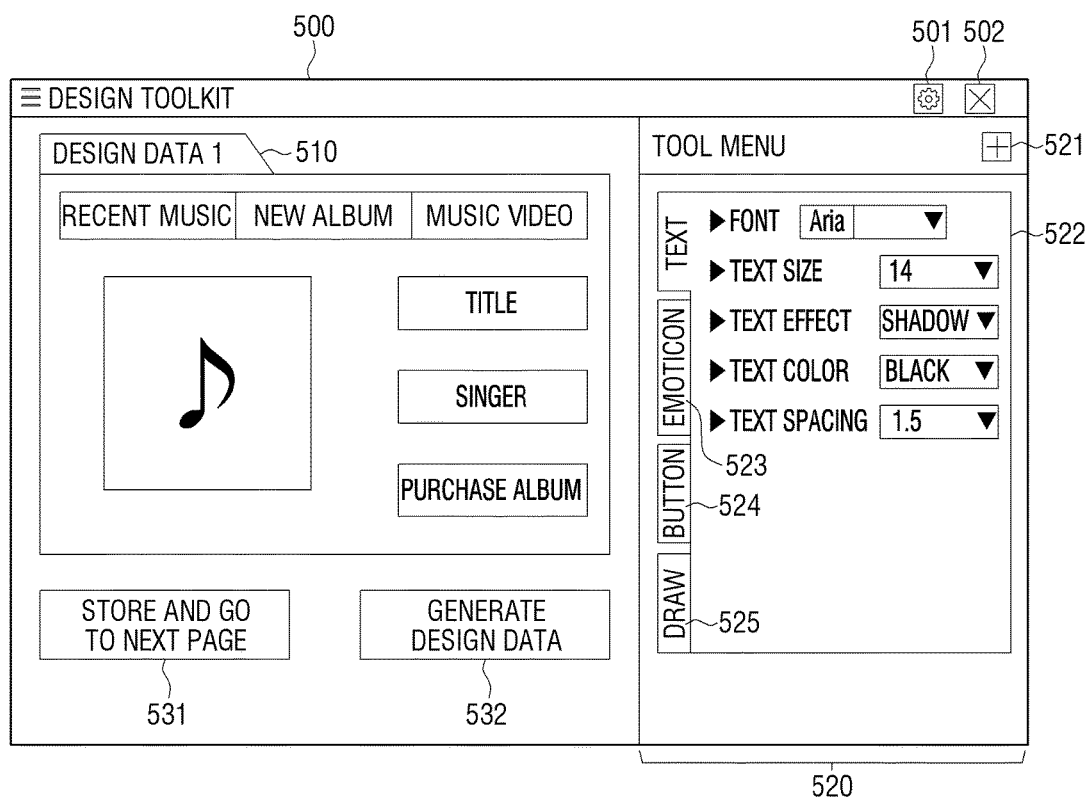
FIG. 5 is a view illustrating an example of a design toolkit provided by a first host device.

FIG. 5 is a view illustrating an example of a design toolkit provided by the first host device. FIG. 5 illustrates a screen of a design toolkit 500 where the first host device 110 and the first host device 220 illustrated in FIGS. 1 and 2, respectively, are executed.

The design toolkit 500 is necessary to design and produce design data. The design toolkit 500 includes a first button 501, to set or change the environment or properties of the design toolkit 500, and a second button 502, to terminate or end the execution of the design toolkit 500, on the upper right portion. In addition, the design toolkit 500 includes a work screen window 510 and a tool menu window 520.

The tool menu window 520 includes various tools which can be used to generate design data. For example, as illustrated in FIG. 5, the tool menu window 520 includes a text tab 522, an emoticon tab 523, a button tab 524, and a drawing tab 525.

In addition, each of the tool tab 522-525 may include a plurality of tools. For example, the text tab 522 includes tools related to text, and may include a font, a text size, a text effect, a text color, text spacing, etc. Accordingly, a user may select a tool on the text tab 522 when it is desired to input text while generating design data.

In addition, a user may use a desired tool such as an emoticon, a button layout, and a drawing tool by selecting the emoticon tab 523, the button tab 524, and the drawing tab 525, respectively.

The size of the tool menu window 520 may be limited in the design toolkit 500, so all tool menus may not be displayed on the window at a single time. Accordingly, if a user needs to use a tool menu which is not displayed on the window, the user may add the desired tool menu by selecting an add button 521.

When a user selects certain tools from the tool menu window 520, or selects certain tools for writing or drawing, jobs corresponding to each operation may be displayed on the work screen window 510. That is, a user may perform a job for generating design data on the work window screen window 510 using various tools. In this case, the user may select various tools for writing or drawing by using a touch screen, a touch pen, a mouse, a keyboard, etc. on the first host device 110 or first host device 220.

If the design of one page constituting design data is completed on the work window screen 510, a user may select a "store and go to next page" button 531. In this case, the design toolkit 500 displays a screen for designing design data for the next page. The next page may be a page to be displayed or executed when a specific button or a specific function included in the current work page is executed.

For example, if design data is related to an application regarding music, as illustrated in FIG. 5, when a "purchase album" button included in the first page of the design data is selected, the next page regarding the album purchasing may be displayed.

In addition, if the designing of all of the pages constituting the design data is completed, a user may select a "generate design data" button 532. Accordingly, the design toolkit 500 may generate design data by combining a plurality of pages which are stored previously.

If the designing of one page constituting the design data is completed, a user may select "store and go to next page" to store the page of work which is currently completed. In addition, if the designing of all of the pages constituting the design data is completed, a user may select "generate design data." Accordingly, the first host device 110 and the first host device 220 may generate design data including all of the stored pages.

Figure 6:
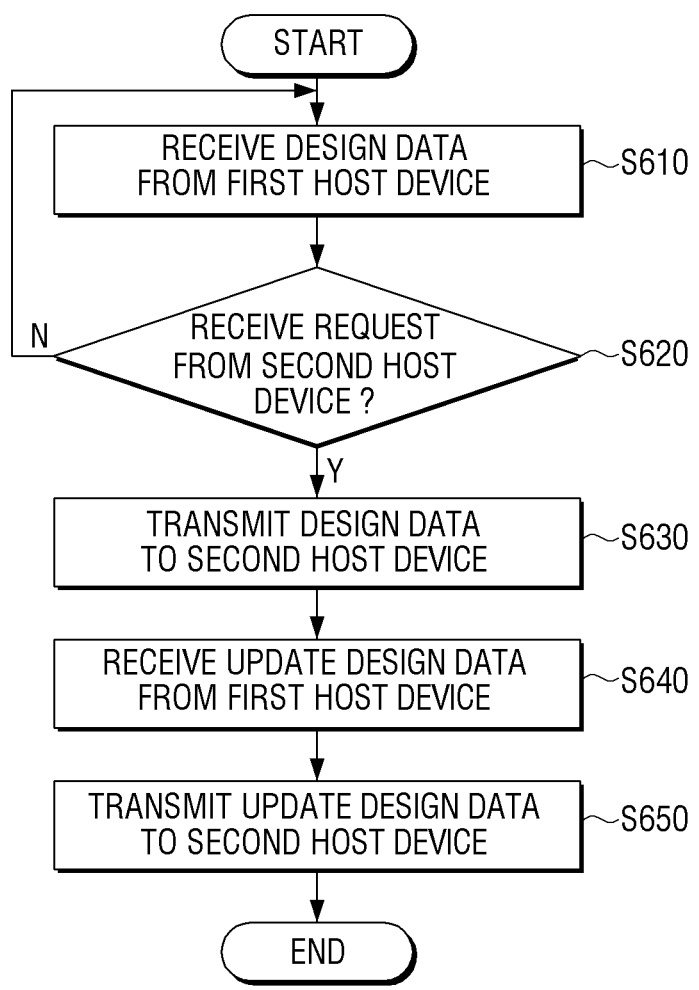
FIG. 6 is a flowchart which is provided to explain a method of providing design data according to an exemplary embodiment.

FIG. 6 is a flowchart which is provided to explain a method of providing design data according to an exemplary embodiment. The design data providing method illustrated in FIG. 6 may be performed by a design server according to an exemplary embodiment.

A design server receives design data from the first host device (S610). In this case, a plurality of pieces of design data may be received from one host device, that is, from the first host device, or design data may be received from a plurality of first host devices. Once design data is received, the design server may store the design data by category.

If a request for design data is received from the second host device (S620), the design server transmits the corresponding design data to the second host device (S630).

The design server receives updated design data from the first host device (S640). The updated design data may be design data which is modified according to a request from a user, such as an application developer. Accordingly, when updated design data regarding certain design data is received, the design server may match the updated design data with the existing design data and store the data.

The design server transmits the updated design data to the second host device (S650). As described above, when the design data is transmitted to the second host device in step S630, the design server may match information regarding the second host device with the design data and store the data. For example, if "first design data" is transmitted to the second host device, information regarding the second host device may be matched with "the first design data."

In addition, if updated design data is received as in step S640, the design server checks design data which is matched with the updated design data. Subsequently, the design server may check information regarding the second host device, which is matched with the design data, and transmit the updated design data to the second host device.

FIG. 7 illustrates a timing view provided to explain an operation of an application generating system. According to FIG. 7, an application generating system includes the first host device 220, the design server 230, the second host device 240, and the application market server 250.

First, the first host device 220 generates design data using a design toolkit (S710), and transmits the design data to the design server 230 (S711).

When the design data is received, the design server 230 stores the design data in a memory (S713).

The second host device 240 generates an application using an application toolkit (S712). The application may only include a programming language without any design data regarding a user interface screen.

Once the application is generated, design data for a user interface screen to be displayed according to an operation of the application is required. Thus, the second host device 240 connects to the design server 230 and requests design data (S714), and the design server 230 transmits the corresponding design data to the second host device 240 (S715).

The second host device 240 transmits update information regarding items to be modified in the received design data to the design server 230 (S716), and the design server 230 transmits the update information to the first host device 220 (S717).

The first host device 220 generates updated design data by applying the update information to the design data (S718), and transmits the updated design data to the design server 230 (S719).

The design server 230 stores the updated design data (S720), and transmits the updated design data to the second host device 240 (S721). The second host device 240 generates a new application by applying the updated design data to the application (S722). The new application is a program capable of adaptively realizing a user interface screen to be displayed on the screen according to an operation of the application, and may be an application which is provided as a product to, for example, a customer.

The second host device 240 transmits a new application to the application market server 250 (S723), and the application market server 250 registers the new application as an application which is available for sale or which can be used by others (S724).

If a download request regarding the new application is received (S725), the application market server 250 transmits the new application to the user terminal device 260 and processes payment (S727). Although payment is shown in the exemplary embodiment, this is merely an example, and the application can be provided free of charge.

The application market server 250 transmits payment information regarding the payment process to the second host device 240 (S728), and the second host device 240 checks the payment information and remits payment to an account linked to the first host device 220 (S729). Specifically, the second host device 240 may check the payment information, and remit payment for the design data to an account linked to the first host device 220 based on the payment ratio set by the previously executed contract.

However, the payment method is not limited to the steps in S728 and S729, and the design server 230 may process payment for the design data while transmitting the design data to the second host device 240 in step S715.

In addition, in step S728 and S729, the second host device 240 receives the payment information, and remits payment for the design data to an account linked to the first host device 220, but the operation may be performed in a reversed manner. Specifically, the first host device 220 may receive the payment information, and transmit payment for the application to an account linked to the second host device 240.

The exemplary embodiments can be recorded as programs that can be executed on a computer and be implemented through general-use digital computers that execute the programs using a computer-readable recording medium.

Examples of the computer-readable recording medium include magnetic storage media (e.g., ROM, floppy disks, hard disks, etc.), optical recording media (e.g., CD-ROMs or DVDs), carrier waves (e.g., transmission through the Internet), etc.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An application design server comprising:
   a communicator; and
   a controller configured to:
      control the communicator to receive design data from a first host device,
      register the design data as a downloadable product on an online market,
      based on receiving a request for the design data on the online market from a second host device, transmit the received design data to the second host device,
      based on receiving refined information, which is generated by the second host device and indicates a modification to be made to the design data, from the second host device, control the communicator to transmit the refined information to the first host device, and
      based on receiving refined design data corresponding to the design data from the first host device, control the communicator to transmit the refined design data to the second host device,
   wherein the refined information includes identification information of the design data and information regarding items to be modified in the design data,
   wherein the design data includes at least one image representing a user interface of an application,
   wherein the refined design data is applicable to the application obtained by the second host device, and
   wherein the refined design data is generated by the first host device, by applying the refined information to the design data on a design toolkit.

2. The application design server as claimed in claim 1, wherein the controller is configured to receive the refined information from the second host device a plurality of times, and receive the refined design data according to the refined information from the first host device a plurality of times.

3. The application design server as claimed in claim 1, further comprising:
a storage configured to store a plurality of pieces of design data including the design data by category.

4. The application design server as claimed in claim 3, wherein the request from the second host device includes category information, and
wherein the controller is configured to search design data including the category information in the storage, and transmit the design data including the category information to the second host device.

5. The application design server as claimed in claim 3, wherein the controller is configured to match the design data with apparatus information regarding the second host device to which the refined design data is transmitted, and store the refined design data.

6. A method of providing design data of an application design server, the method comprising:
based on receiving design data from a first host device, registering the design data as a downloadable product on an online market;
based on receiving a request for the design data on the online market from a second host device, transmitting the received design data to the second host device;
based on receiving refined information, which is generated by the second host device and indicates a modification to be made to the design data from the second host device, transmitting the refined information to the first host device; and
based on receiving refined design data corresponding to the design data from the first host device, transmitting the refined design data to the second host device,
wherein the refined information includes identification information of the design data and information regarding items to be modified in the design data,
wherein the design data includes at least one image representing a user interface of an application,
wherein the refined design data is applicable to the application obtained by the second host device, and
wherein the refined design data is generated by the first host device, by applying the refined information to the design data on a design toolkit.

7. The method as claimed in claim 6, based on receiving the refined information from the second host device a plurality of times, receiving the refined design data according to the refined information from the first host device a plurality of times.

8. The method as claimed in claim 6, further comprising:
storing the received design data in a memory by category, and
wherein the transmitting the received design data to the second host device comprises searching design data including category information and a keyword included in the request from the second host device and transmitting the design data which is found according to the searching to the second host device.

9. An application obtaining system, comprising:
a first host device configured to obtain design data using a design toolkit;
a design server configured to store the design data obtained by the first host device and register the design data as a downloadable product on an online market; and
a second host device configured to request the design data on the online market from the design server and receive the design data,
wherein the design server is further configured to:
based on receiving refined information, which is generated by the second host device and indicates a modification to be made to the design data from the second host device, transmit the refined information to the first host device, and
based on receiving refined design data corresponding to the design data from the first host device, transmits the refined design data to the second host device,
wherein the second host device obtains an application using the refined design data,
wherein the refined information includes identification information of the design data and information regarding items to be modified in the design data,
wherein the design data includes at least one image representing a user interface of the application,
wherein the refined design data is applicable to the application obtained by the second host device, and
wherein the first host device generates the refined design data by applying the refined information to the design data on the design toolkit.

10. The application obtaining system as claimed in claim 9, further comprising:
an application market server configured to, based on receiving a request from the second host device, register the application where the refined design data is applied, and in response receiving a download request from a user terminal device, transmit the registered application to the user terminal device.

11. The application obtaining system as claimed in claim 10, wherein the application market server processes payment with respect to the user terminal device according to a download regarding the application, and transmits payment information regarding the payment to at least one of the first host device and the second host device.

12. The application obtaining system as claimed in claim 9, wherein the design toolkit comprises a user interface including a plurality of commands for obtaining the design data for the application.

* * * * *